3,660,337
THERMOSTABLE RESINS AND THEIR
PRODUCTION
Maurice Balme and Maurice Ducloux, Rhone, France,
assignors to Rhone-Poulenc S.A., Paris, France
No Drawing. Filed July 8, 1968, Ser. No. 743,016
Claims priority, application France, July 13, 1967,
114,383
The portion of the term of the patent subsequent to
Feb. 1, 1989, has been disclaimed
Int. Cl. C08g 25/00
U.S. Cl. 260—29.2     9 Claims

ABSTRACT OF THE DISCLOSURE

Thermostable resins are made by dissolving in ammonia a polycondensation product of a monophenol or polyphenol with a polyanhydride, a corresponding polyacid, evaporating the solution to dryness, and heating the residue.

---

This invention relates to thermostable resins based on phenols, and their production.

Hitherto, polymers based on phenols having a certain thermal stability have been resins obtained by condensation of phenols with aldehydes, such as formaldehyde or furfural.

Polycondensates of phenols with polyanhydrides have also been obtained [Austral. J. Chem. 12, 643–56 (1956)], but these polymers, prepared with a view for use in semiconductors, are unsuitable for the production of thermostable materials capable of being used in the commercially useful mouldings and laminates.

New compositions have now been found which are easy to use, to shape, particularly into mouldings or laminates, and which in addition, after thermosetting, provide materials having a good thermal stability.

These new compositions are solutions, obtained by dissolving in aqueous ammonia, a polycondensation product of a monophenol or polyphenol with a polyanhydride of formula:

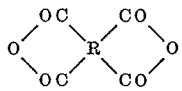

in which R is a tetravalent radical containing at least 2 carbon atoms, or with a corresponding polyacid. These solutions after evaporation to dryness, shaping and heat-setting give heat-stable objects.

The term "polycondensate" as used herein, does not, of course, include the simple phthaleins, such as phenophthalein, which are obviously soluble in ammonia, but includes only products with a very much higher degree of condensation. Furthermore, it is to be understood that where terms such as "dissolution," "to dissolve," "solution," are used herein, they refer only to the external appearance of the phenomena involved, because it is believed that a chemical reaction takes place between the ammonia and the phenol-anhydride (or acid) polymer, and that more than purely physical phenomena are involved.

To obtain the products of the invention, the initial step is to polycondense one or more monophenols or polyphenols with one or more polyanhydrides (or polyacids).

Suitable phenols are phenol, the cresols, pyrocatechol, resorcinol, hydroquinone, anthrahydroquinone, 1,2,3-, 1,3,5- and 1,2,4-trihydroxybenzenes, trimethylolphenol, the naphthols, the dihydroxybiphenyls, bis-(4-hydroxyphenyl)methane, and bis-(4-hydroxyphenyl)-2,2-propane; the phthaleins are also suitable.

The polyanhydrides which can be used have the formula:

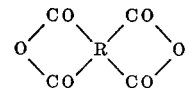

in which R is a tetravalent radical containing at least 2 carbon atoms, which can be of aliphatic, cycloaliphatic, heterocyclic or aromatic nature. R may, more especially, be a linear or branched, saturated aliphatic radical having from 2 to 4 carbon atoms, a saturated alicyclic radical with 5 or 6 carbon atoms in the ring, a heterocyclic radical containing at least one of the atoms O, N and S, a condensed monocyclic or polycyclic aromatic radical or a polycyclic aromatic radial having several ondensed or uncondensed ring systems which are connected by valency bonds or by atoms or groupings; the atoms or groupings capable of connecting these aromatic ring systems can for example be oxygen or sulphur atoms, alkylene radicals having from 1 to 3 carbon atoms, the groupings $$-\underset{\underset{O}{\|}}{C}-, \quad -SO_2-, \quad -N=N-, \quad -\underset{\underset{O}{\downarrow}}{N}=N-,$$

$$-CO-NY-X-NY-CO-, \quad -CO-O-X-O-CO-$$

in which X represents a linear or branched alkylene radical having fewer than 13 carbon atoms, a cycloalkylene radical with 5 or 6 carbon atoms in the ring or a monocyclic or polycyclic arylene radical, and Y represents an alkyl radical with 1 to 4 carbon atoms or a cycloalkyl radical or a condensed monocyclic or polycyclic aromatic radical.

Suitable dianhydrides include more especially pyromellitic dianhydride,
polyhydropyromellitic dianhydride,
2,3,6,7-naphthalene-tetracarboxylic dianhydride,
3,3',4,4'-diphenyl-tetracarboxylic dianhydride,
1,2,5,6-naphthalene-tetracarboxylic dianhydride,
2,2',3,3'-diphenyl-tetracarboxylic dianhydride,
bis-2,2-(3,4-dicarboxyphenyl)-propane dianhydride,
bis-(3,4-dicarboxyphenyl)-sulphone dianhydride,
perylene-3,4,9,10-tetracarboxylic dianhydride,
bis-(3,4-dicarboxyphenyl)ether dianhydride,
ethylene-tetracarboxylic dianhydride,
naphthalene-1,2,4,5-tetracarboxylic dianhydride,
naphthalene-1,4,5,8-tetracarboxylic dianhydride,
decahydronaphthalene-1,4,5,8-tetracarboxylic
  dianhydride,
4,8-dimethyl-1,2,3,5,6,7-hexahydronaphthalene-1,2,5,6-
  tetracarboxylic dianhydride,
2,6-dichloronaphthalene-1,4,5,8-tetracarboxylic
  dianhydride,
2,7-dichloronaphthalene-1,4,5,8-tetracarboxylic
  dianhydride,
2,3,6,7-tetrachloronaphthalene-1,4,5,8-tetracarboxylic
  dianhydride,
phenanthrene-1,8,9,10-tetracarboxylic dianhydride,
cyclopentane-tetracarboxylic dianhydride,
pyrrolidine-2,3,4,5-tetracarboxylic dianhydride,
pyrazine-2,3,5,6-tetracarboxylic dianhydride,
bis-2,2-(2,3-dicarboxyphenyl)-propane dianhydride,
bis-1,1-(2,3-dicarboxyphenyl)ethane dianhydride,
bis-1,1-(3,4-dicarboxyphenyl)ethane dianhydride,
bis-(2,3-dicarboxyphenyl)methane dianhydride,
bis-(3,4-dicarboxyphenyl)methane dianhydride,
bis-(3,4-dicarboxyphenyl)-sulphone dianhydride,
benzene-1,2,3,4-tetracarboxylic dianhydride,
butane-1,2,3,4-tetracarboxylic dianhydride,
thiophene-2,3,4,5-tetracarboxylic dianhydride,
furane-tetracarboxylic dianhydride,
benzophenone-tetracarboxylic dianhydride,
azobenzene and azoxybenzene tetracarboxylic
  anhydrides,
bis-(dicarboxybenzoyl)benzene dianhydrides.

The polyacids which are used are the polyacids corresponding to the polyanhydrides which have been mentioned.

The polycondensates to be dissolved in the ammonia are prepared by heating the dianhydrides with the phenols, preferably with elimination of the water formed during the reaction.

In practice, it is advantageous to operate as follows. The dianhydride (or the corresponding tetracid) is mixed with the phenol in a reactor. A catalyst, such as para-toluenesulphonic acid, can be added. In certain cases, it is possible to work without a catalyst, particularly when its presence would be harmful to the final polymer. This presence can in fact be the cause of a lowering of the thermal stability. It is frequently useful to add to the reactants a small quantity of a solvent such as benzene, capable of forming an azeotrope with the water (this making it possible, at the time of heating, to follow the progress of the reaction by measuring the quantity of water which has been entrained).

The proportion of phenol used is higher than 0.5 mol and is preferably between 1.5 and 3 mols per mol of anhydride. A deficiency of phenol leads to a product having less satisfactory properties and makes difficult the agitation during the polycondensation. An excess of phenol is not harmful and even facilitates the agitation during the polycondensation, but complicates the purification of the polymer.

The mixture of phenol and dianhydride (or tetracid) is heated, preferably with stirring, to a temperature between 100 and 400° C. and advantageously between 120 and 250° C. The reaction is continued until more than 0.5 mol of water per mol of initially introduced dianhydride, and preferably 0.9 to 1.5 mols of water, has been eliminated. When a tetracid is used instead of an anhydride, it is obviously necessary to add 2 mols of water to the figures indicated. The heating is then continued, possibly under reduced pressure, so as to drive off any excess of phenol present in the medium. It is obvious that this only applies with the volatile phenols. With the non-volatile phenols, it is preferable to avoid the use of an excess of phenol, which necessitates purification of the polymer obtained. It is also possible to eliminate the excess of phenol with a solvent without any action on the polymer.

After cooling, the polymer is removed from the reactor. It is frequently convenient to grind this polymer to reduce it to the form of a powder, so as to make it easier to handle.

The polymer is then added to an aqueous ammonia solution. It is also possible to prepare the ammoniacal polycondensate solution by adding ammonia to the reactor containing the polycondensate, before or after the latter has cooled. The dissolution is effected by simple mixing, preferably with stirring, cold or hot.

The concentration of the ammonia in the water and the quantity of aqueous ammonia used are functions of the quantity and concentration of the solution which it is desired to obtain and also of the degree of condensation of the polymer to be dissolved, i.e. of the duration and the intensity of the heating during its polycondensation. A high ammonia concentration enables a more concentrated solution to be obtained. A low concentration of ammonia gives solutions with an insufficient polymer content to be of practical interest. It is advantageous to use commercial ammonia solutions, i.e. solutions with a density of the order of 0.9.

In this way, a polymer solution is obtained with which it is possible, for example, to coat surfaces or to impregnate fabrics, and which may be used in the manufacture of laminates.

It is then expedient to evaporate the water and excess ammonia by heating or application of a vacuum, or by The pressure is then progressively increased in 5 minutes to 32 kg. cm.² and heating is continued for 4 hours at be used as such, possibly in solution in a polar solvent, or they can be subjected to a supplementary heat treatment. This supplementary heat treatment is particularly useful in the case of compositions used for moulding. The thermosetting compositions are then heated, preferably under pressure, to produce glazed objects, coatings or thermostable laminates. It is generally sufficient to heat the objects obtained for less than 5 hours at temperatures of the order of 200° to 450° C., and preferably 280 to 400° C. The degree of applied pressure is not critical.

Before the final heating of these compositions, a hardener can be added thereto. In general, by "hardener" is meant a compound causing a crosslinking, a lengthening of the polymer chains, or the formation of branches by reaction with the chemical functions which are present. This hardener is advantageously an aromatic polyamine, such as one of the three phenylene diamines, 4,4'-diaminodiphenyl, bis - (4 - aminophenyl)methane, 2,6-diaminopyridine, or 2-aminopentyl-4,5H-amino-6,7-dihydrocyclopenta[d]pyrimidine of formula:

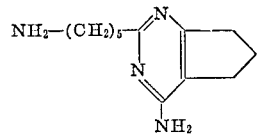

The hardener can also be formaldehyde, an isocyanate, or hexamethylene tetramine.

The following examples illustrate the preparation and the use of the compositions according to the invention. In these examples, the flexure test is carried out according to the A.S.T.M. standard D 790–63, the span being equal to 50 mm. for the tests on laminates and to 25.4 mm. for the tests on mouldings.

EXAMPLE 1

A mixture containing 50 g. of azophthalic anhydride, 36 g. of phenol, and 30 cc. of benzene is progressively heated to 180° C. After heating for 4 hours at 180° C., 2.7 g. of water have been eliminated as the binary water-benzene azeotrope.

The residue is then progressively heated under reduced pressure (1 mm. Hg) to 300° C. for 1 hour, and the excess phenol is distilled off. After cooling, the solid residue is ground and 64 g. of powder A are obtained, having a softening point of about 245° C.

10 g. of this powder are dissolved in 40 cc. of ammonia (d.=0.92) at 25° C. with stirring for half an hour, and the solvent and excess ammonia are then evaporated by heating the solution for 4 hours to 160° C. under a pressure which is progressively reduced until 1 mm. Hg is finally obtained. The solid residue is cooled and ground into a powder B which softens in the region of 235° C.

The difference in chemical constitution between the two polymers may be shown in the following manner. (a) The powders A and B are heated for half an hour from 25° to 350° C. and then for 1 hour at 350° C. Microanalysis of the two products showed: Polymer A: nitrogen; 5.31%; Polymer B: nitrogen; 10.64%. (b) The infra-red spectrum of powder B indicates the presence of bands: for —C=O, amide, at 6.08μ; and for

carboxylate at 6.3μ and 7.25 to 7.30μ. These bands are absent in the spectrum of powder A. The polymer B, obtained by heating the powder B (see a) shows imide bands at 5.67 and 5.85μ, which are absent in the polymer A obtained by heating the powder A.

EXAMPLE 2

A mixture containing 322 g. of azophthalic anhydride, 188 g. of phenol, and 50 cc. of benzene is progressively heated to 180° C., the water formed being simultaneously eliminated as the binary water-benzene azeotrope. The mixture is then kept for 4 hours at 180° C., and 18.9 g. of water are collected. The residue is then heated progressively under reduced pressure (0.5 mm. Hg) to 300° C., and 79 g. of unreacted phenol are distilled off.

After cooling, the solid residue is finely ground. The powder obtained has a softening point of the order of 235° C. 75 g. of this powder are dissolved in 175 cc. of aqueous ammonia (d.=0.92) at 25° C. with stirring. The solution is used for impregnating 16 samples (each 15 x 15 cm.) of glass fabric of the satin type having a weight of 308 g./m.$^2$. This fabric was subjected to deoiling by heating and to treatment with γ-aminopropyltriethoxysilane. The samples were then dried at 120° C. in a ventilated atmosphere for 1 hour and then under reduced pressure (15 mm. Hg) for 2 hours.

The samples are stacked and the assembly is heated at 330° C. under 2 kg./cm.$^2$ for 10 minutes and then at 350° C. under 32 kg./cm.$^2$ for 3 hours. The laminate obtained contains 22% by weight of resin. Parallelepipedic test elements with the dimensions 70 mm. x 10 mm. (thickness 3 mm.) are formed therefrom. The resistance to flexure on break is measured. The span (distance of the supports of the test element during the application of the pressure) is 50 mm. The resistance is 50.1 kg./mm.$^2$. After heating for 192 hours at 300° C. in a ventilated oven, the resistance is 24.8 kg./mm.$^2$, and after 288 hours it is 15.2 kg./mm.$^2$.

EXAMPLE 3

The procedure is as in Example 2. A mixture of 200 g. of azophthalic anhydride, 117 g. of phenol, and 50 cc. of benzene is heated for 4 hours at 180° C. 11.4 g. of water are collected and 38 g. of phenol are distilled off.

A laminate is obtained under the same coating and drying conditions as in Example 2, but here the assembly is heated for 10 minutes at 330° C., under 2 kg./cm.$^2$ and then for 4 hours at 380° C., under 32 kg./cm.$^2$. The laminate obtained contains 18.2% by weight of resin and shows a resistance to flexure on break of 64.3 kg./mm.$^2$. After being left for 192 hours at 330° C., this resistance is still 21.4 kg./mm.$^2$.

EXAMPLE 4

A mixture of 100 g. of azophthalic anhydride, 58 g. of phenol, and 30 cc. of benzene is heated as in Example 2. 6.4 g. of water are collected. After distilling off the phenol, cooling and grinding, 134 g. of powder A are obtained which softens in the region of 230° C. 20 g. of this powder are dissolved at 25° C., with stirring in 80 cc. of concentrated ammonia (d.=0.92), and the volatile products are then removed by heating the solution to 160° C., under progressively reduced pressure until finally 1 mm. Hg is reached. The solid residue is cooled and ground into a powder B, softening in the region of 230° C.

6.2 g. of powder B and 24.8 g. of finely divided mica (grain size: 5μ) are intimately mixed and a disc is formed as described in the following example. The disc obtained has a thickness of 3 mm. Parallelepipedic test elements are formed therefrom with dimensions of 30 x 8 x 3 mm., with which are carried out tests for resistance to flexure on break. The span (distance between the supports of the test element during the application of the pressure) is 25.4 mm. The resistance is 7.6 kg./mm.$^2$. After being left for 126 hours at 300° C., the resistance is 4.18 kg./mm.$^2$.

EXAMPLE 5

322 g. of azophthalic anhydride, 188 g. of phenol, and 50 cc. of benzene are heated as previously described. 17 g. of water are removed and 75 g. of phenol are distilled off. A powder A is recovered, which softens in the region of 220° C.

100 g. of this powder are dissolved at 25° C. in 200 cc. of ammonia (d.=0.92) and the solution obtained is then evaporated at 90° C./200 mm. Hg for 4 hours. The product obtained is heated for 16 hours at 300° C. under nitrogen. After screening and grinding, a powder B is recovered with a softening point of about 450° C.

24 g. of this powder B are introduced into a cylindrical mould with a diameter of 76 mm. The mould is heated for 10 minutes at 300° C., under a pressure of 5 kg./cm.$^2$ and then for 1 hour at 300° C., under a pressure of 200 kg./cm.$^2$. The disc obtained has a thickness of 3.6 mm. and a resistance to flexure on break of 3.3 kg./mm.$^2$.

EXAMPLE 6

A mixture formed of 322.2 g. of azophthalic anhydride, 188 g. of phenol, and 50 cc. of benzene is progressively heated while the water formed is simultaneously distilled off as a binary water-benzene azeotrope. The temperature reaches 190° C., after 1½ hours and, after 2½ hours at this temperature, 17.2 g. of water have been collected. The mixture is cooled and when its temperature reaches 160° C., 1300 cc. of concentrated ammonia (d.=0.92) are quickly added with stirring. After homogenisation, 1638 g. of ammoniacal solution A are obtained.

2.8 g. of metaphenylene diamine are added to 159.5 g. of solution A with stirring, and stirring is continued for 1 hour. With the final solution, 16 samples (each 15 cm. x 15 cm.) of glass fabric of the satin type, having a weight of 308 g./m.$^2$, are impregnated. This fabric has undergone a deboiling by heating followed by a treatment with γ-aminopropyltriethoxysilane. The samples are dried at 100° C. for 2 hours in a ventilated atmosphere and then for 2 hours under reduced pressure (50 mm. Hg) and they are stacked to form a laminated assembly.

This assembly is compressed under a pressure of 32 kg./cm.$^2$ and heated under pressure for 2 hours at 370° C. The laminate obtained, after being cooled, contains 14.8% by weight of resin and shows a resistance to flexure on break of 72.6 kg./mm.$^2$. This resistance retains 64% of its original value after the laminate has been placed for 96 hours in a ventilated oven kept at 300° C.

EXAMPLE 7

(a) The procedure is as described Example 6, the mixture of anhydride, phenol and benzene being heated at 185° C., for 3½ hours. 18 g. of water are collected. After adding ammonia, 1577 g. of a solution S are obtained.

(b) 1.62 g. of bis-(4-aminophenyl)-methane are introduced with stirring into 50.75 g. of solution S and the mixture is stirred for 1 hour. A glass fabric laminate is prepared with the final solution, using the procedure indicated in Example 2. This laminate is heated to 350° C. for 2 hours at a pressure of 32 kg./cm.$^2$. It shows a resistance to flexure on break of 63 kg./mm.$^2$.

(c) 1.75 g. of 3,3′-diaminobenzidine are introduced with stirring into 50.75 g. of solution S, and the mixture is then heated to 70° C. with continued stirring. Using the final solution, a laminate is prepared in the manner indicated in Example 1, this laminate having a resistance to flexure on break of 65.5 kg./mm.$^2$.

(d) 50.75 g. of solution S are combined with 0.89 g. of 2,6-diaminopyridine for 1 hour. This solution gives a laminate having a resistance to flexure on break of 53 kg./mm.$^2$.

(e) 50.75 g. of solution S are stirred with 1.8 g. of 2-(5-aminopentyl) - 4,5H - amino-6,7-dihydrocyclopenta-[d]-pyrimidine of formula:

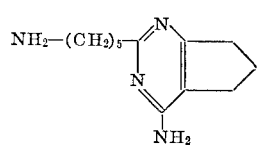

Heating to 70° C., is carried out so as to have a solution suitable for the coating of fabric. A laminate with a resistance to flexure on break of 60 kg./mm.$^2$ is obtained.

EXAMPLE 8

A mixture comprising 21.8 g. of pyromellitic anhydride, 22 g. of resorcinol, 20 g. of benzene and 0.3 g. of p-toluene-sulphonic acid is heated for 25 minutes at 210° C. The water eliminated weighs 0.4 g. 120 cc. of ammonia (d.=0.92) and then 10.8 g. of metaphenylene diamine are added. This solution is used to prepare a laminate with a resistance to flexure on break of 57.8 kg./mm.²

EXAMPLE 9

A mixture of 966 g. of azophthalic anhydride, 580 g. of phenol, and 50 cc. of benzene is heated for 10 hours at 180° C. During the heating, 57.6 g. of water are removed as a binary water-benzene azeotrope. By distillation under reduced pressure, the excess phenol (238 g.) is also eliminated. After cooling, the residue is ground and 41.5 g. thereof are dissolved in 105 cc. of ammonia (d.=0.92).

14 sheets of glass fabric as used in Example 2, and each with the dimensions 12 x 12 cm., are coated with the whole of this solution. These sheets are dried for 1 hour at 120° C., in a ventilated oven and then for 2 hours at 120° C./15 mm. Hg. Finally, they are heat-treated for 1 hour at 320° C., in a nitrogen atmosphere. They are then stacked, placed in a press and heated for 5 minutes at 330° C. The pressure is then progressively increased in 5 minutes so as to obtain a laminate of which the final thickness is 3 mm., fixed with thickness gauges. Under these conditions, the heating is carried out for 3 hours at 370° C.

The laminate obtained contains 28.4% by weight of resin. It has a resistance to flexure on break of 41 kg./mm.² After 192 hours at 300° C., this resistance is 27 kg./mm.² and, after 504 hours, it is 10 kg./mm.²

EXAMPLE 10

A mixture of 100 g. of azophthalic anhydride, 116 g. of phenol, and 20 cc. of benzene is heated for 4 hours at 180° C. 6.0 g. of water are collected. The mixture is cooled and, when the temperature reaches 40° C., 200 cc. of acetone are poured in, thus dissolving the phenol and the major part of the polymer. This mixture is then poured into 1 litre of cyclohexane kept at 30° C., and stirred for 1 hour with a turbine rotating at 8000 r.p.m. The polymer in suspension is filtered off, and washed with a mixture of cyclohexane-acetone in a volumetric proportion of 10/1. In this may, 130 g. of polymer A are collected.

41.5 g. of this powder are dissolved in 105 cc. of ammonia (d.=0.92). 14 sheets of glass fabric as used in Example 2 and each with the dimensions 12 x 12 cm. are coated with the whole of this solution. These specimens are dried as in Example 9 and they are then heat-treated for 20 minutes at 350° C., in a nitrogen atmosphere.

The sheets are then stacked and placed in a press for 3 hours at 370° C., under pressure, the final thickness of the laminate being fixed at 3 mm. by thickness gauges. The laminate obtained contains 29.9% of resin. It is subjected to a heat treatment for 60 hours at 300° C., under nitrogen, and then shows a resistance to flexure on break of 39 kg./mm.²

The laminate is subjected to ageing tests. After 192 hours at 300° C., its resistance to flexure on break is 25 kg./mm.²; after 504 hours, it is 14 kg./mm.²

EXAMPLES 11 TO 14

A polymer A identical with that of Example 10 is prepared; 65 g. of this powder are dissolved in 165 cc. of ammonia (d.=0.92). 14 sheets of glass fabric as used in Example 2 and each with the dimensions 15 x 15 cm. are coated with the whole of this solution. These specimens are dried as in Example 9 and heat-treated for 1 hour at 250° C., in air. The sheets are then stacked, introduced into a press and heated for 10 minutes at 350° C. The pressure is then progressively increased in 5 minutes to 32 kg./cm.² and heating is continued for 4 hours at 370° C. The laminate obtained contains 23% by weight of resin and has a thickness of about 3 mm.

Using this laminate, various test elements are formed. The resistance to flexure on break is 68 kg./mm.² These test elements are exposed for 30 minutes to very high temperatures and their resistance to flexure on break at the said temperature is measured. The following results are obtained:

| Example | 11 | 12 | 13 | 14 |
|---|---|---|---|---|
| Temperature of exposure in ° C | 300 | 350 | 400 | 450 |
| Resistance to flexure on break in kg./mm.² | 62.2 | 52.7 | 44.4 | 36.8 |

We claim:

1. A solution obtained by dissolving in aqueous ammonia a polycondensation product consisting essentially of a reaction product of (i) a monophenol or polyphenol selected from the group consisting of phenol, a cresol, pyrocatechol, resorcinol, hydroquinone, anthrahydroquinone, 1,2,3-, 1,3,5- or 1,2,4-trihydroxybenzene, trimethylolphenol, a naphthol, a dihydroxybiphenyl, bis-(4-hydroxyphenyl) methane, bis - (4 - hydroxyphenyl)-2,2-propane or a phthalein and (ii) a polyanhydride of formula:

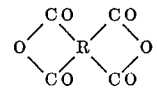

in which R is a tetravalent radical containing at least 2 carbon atoms, or with a corresponding polyacid, more than 0.5 mol of monophenol or polyphenol being used per mole of polyanhydride, by reaction at between 100° and 400° C., until more than 0.5 mol of water per mole of dianhydride, or more than 2.5 mol of water per mole of said polyacid, but less than 1.5 mol of water per mole of dianhydride, or less than 3.5 mol water per mole of said polyacid, has been eliminated.

2. A prepolymer obtained by dissolving in aqueous ammonia a polycondensation product consisting essentially of a reaction product of (i) a monophenol or polyphenol selected from the group consisting of phenol, a cresol, pyrocatechol, resorcinol, hydroquinone, anthrahydroquinone, 1,2,3- 1,3,5- or 1,2,4-trihydroxybenzene, trimethylolphenol, a naphthol, a dihydroxybiphenyl, bis-(4-hydroxyphenyl) methane, bis-(4-hydroxyphenyl)-2,2-propane or a phthalein and (ii) a polyanhydride of formula:

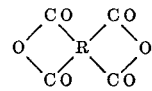

in which R is a tetravalent radical containing at least 2 carbon atoms, or with a corresponding polyacid, more than 0.5 mol of monophenol or polyphenol being used per mole of polyanhydride, by reaction at between 100° and 400° C., until more than 0.5 mol of water per mole of dianhydride, or more than 2.5 mol of water per mole of said polyacid, but less than 1.5 mol of water per mole of dianhydride, or less than 3.5 mol of water per mole of said polyacid, has been eliminated, and evaporating the solution to dryness.

3. A polymer obtained by dissolving in aqueous ammonia a polycondensation product consisting essentially of a reaction product of (i) a monophenol or polyphenol selected from the group consisting of phenol, a cresol, pyrocatechol, resorcinol, hydroquinone, anthrahydroquinone, 1,2,3-, 1,3,5- or 1,2,4-trihydroxybenzene, trimethylolphenol, a naphthol, a dihydroxybiphenyl, bis(4-hydroxyphenyl) methane, bis - (4 - hydroxyphenyl)-2,2- propane or a phthalein and (ii) a polyanhydride of formula:

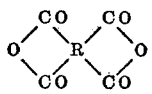

in which R is a tetravalent radical containing at least 2 carbon atoms, or with a corresponding polyacid, more than 0.5 mol of monophenol or polyphenol being used per mole of polyanhydride, by reaction at between 100° and 400° C., until more than 0.5 mol of water per mole of dianhydride, or more than 2.5 mol of water per mole of said polyacid, but less than 1.5 mol of water per mole of dianhydride, or less than 3.5 mol of water per mole of said polyacid, has been eliminated, evaporating the solution to dryness, and heating the residue to 200° to 450° C.

4. A solution according to claim 1 in which R is

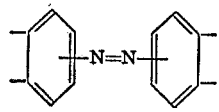

or

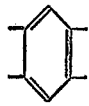

5. A solution according to claim 1 in which the phenol or polyphenol used is phenol or resorcinol.

6. A solution according to claim 1 in which the polycondensation is effected at between 120° and 250° C., until 0.9 to 1.5 mols of water per mole of dianhydride, or 2.9 to 3.5 mols of water per mole of polyacid, have been eliminated.

7. A prepolymer according to claim 2 in which the monophenol or polyphenol is phenol or resorcinol.

8. A polymer according to claim 3 in which the monophenol or polyphenol is phenol or resorcinol.

9. A polymer according to claim 3 in which the temperature is 280° to 400° C.

References Cited

UNITED STATES PATENTS

| 2,595,343 | 5/1962 | Drewitt et al. | 260—47 |
| 3,298,918 | 1/1967 | Hicks et al. | 260—47 |
| 3,415,788 | 12/1968 | Jedlicka | 260—47 |
| 3,448,068 | 6/1969 | Holub et al. | 260—29.2 N |

OTHER REFERENCES

McNeill et al., Austral. J. of Chem. 12, 643–56 (1959).

JULIUS FROME, Primary Examiner

A. H. KOECKERT, Assistant Examiner

U.S. Cl. X.R.

117—126; 156—300; 260—47 C